United States Patent
Bond

[11] Patent Number: 6,050,257
[45] Date of Patent: Apr. 18, 2000

[54] DISASSEMBLEABLE GRILL

[75] Inventor: Joseph N. Bond, Commack, N.Y.

[73] Assignee: Bondco, Inc., Commack, N.Y.

[21] Appl. No.: 09/227,544

[22] Filed: Jan. 11, 1999

Related U.S. Application Data

[63] Continuation-in-part of application No. 09/038,138, Mar. 11, 1998.

[51] Int. Cl.⁷ ............... A47J 37/00; A47J 27/00; F24C 1/16; A23L 29/02
[52] U.S. Cl. ............ 126/25 R; 126/9 R; 126/40; 126/29; 126/9 B; 99/339; 99/340; 99/447; 99/449
[58] Field of Search ................ 126/9 R, 25 R, 126/25 A, 26, 29, 30, 33, 40, 43, 44, 9 B, 377, 373, 258, 260; 99/339, 340, 447, 448, 449, 450, 481, 482, 357, 419, 420, 421 R, 421 A, 421 H, 421 HH, 421 HV, 421 M, 421 P, 421 TP, 421 V; 248/150, 153, 165, 168, 156; 211/186, 189; D7/337, 355, 366

[56] References Cited

U.S. PATENT DOCUMENTS

| | | |
|---|---|---|
| 4,177,790 | 12/1979 | Zenzaburo ............... 126/9 R |
| 4,488,535 | 12/1984 | Johnson ............... 126/9 R |
| 4,526,158 | 7/1985 | Lee . |
| 4,530,343 | 7/1985 | Beck . |
| 4,589,399 | 5/1986 | Hamill et al. . |
| 4,688,543 | 8/1987 | Kopke . |
| 4,829,975 | 5/1989 | Hait ............... 126/9 R |
| 4,885,989 | 12/1989 | Korpan . |
| 4,896,650 | 1/1990 | Hait ............... 126/9 R |
| 5,103,799 | 4/1992 | Atanasio . |
| 5,243,961 | 9/1993 | Harris . |
| 5,279,277 | 1/1994 | Barker ............... 126/25 R |
| 5,390,658 | 2/1995 | Prock . |
| 5,495,845 | 3/1996 | Hait ............... 126/9 R |
| 5,638,809 | 6/1997 | Wienhold . |
| 5,666,940 | 9/1997 | Kreiter . |

*Primary Examiner*—Ira S. Lazarus
*Assistant Examiner*—David Lee
*Attorney, Agent, or Firm*—Lane, Aitken & McCann

[57] ABSTRACT

An open grill assembly, with a radiant heating sheet, can be assembled together into a rigid grill, with rods forming a frame supporting the radiant sheet and the grid in a spaced apart relationship. The components can be disassembled into a compact bundle, preferably a flat bundle. When assembled, in a preferred embodiment, the radiant heating sheet is adapted to rest on the top of the burner, so that the rods forming the frame need not touch the ground, allowing a single, economical design to be used with most, and perhaps all, commercially available burners. In operation, the burner heats the radiant heating sheet and radiant heat from the sheet cooks food on the grid.

6 Claims, 3 Drawing Sheets

DISASSEMBLEABLE GRILL

RELATED APPLICATIONS

This is a continuation-in-part of U.S. patent application Ser. No. 09/038,138 (Disassembleable Grill) A-20840, filed Mar. 11, 1998.

BACKGROUND OF THE INVENTION

1. Field of the Invention

This invention relates to an assembly for grilling food over an open fire, portable burner and more particularly to a disassembleable unit whose disassembled members can be bundled and conveniently carried by a person engaged in camping, hiking, or other similar activities.

2. Description of Prior Art

Today most hikers, campers and people engaged in similar activities where they carry their gear (e.g. backpackers), use a lightweight, portable, gas fueled, open flame burner or stove for cooking. Cooking with wood fires is environmentally undesirable. Although there have been a number of prior art proposals for portable cooking apparatuses, with the prior art apparatus, campers and others using open fire portable gas burners have been, as a practical matter, limited to frying or boiling their food. It has not been practical to grill or barbecue as, for example, is commonly done with backyard charcoal and gas fired grills. As will be appreciated by those skilled in the cooking art, the distinctive flavor imparted to grilled meats and other foods is not caused by the charcoal in the case of a charcoal grill or the lava rocks in the case of a gas fired grill. The smoke of the drippings from the cooking food is a primary contributor to the distinctive flavor of grilled food.

SUMMARY OF THE INVENTION

An object of this invention is the provision of a disassembleable unit for backpackers and the like, which will allow them to cook food with an open flame, portable burner, imparting to the food the distinctive grilled food flavor.

Briefly, this invention contemplates the provision of an assembly with a radiant heating sheet, and an open grid that can be assembled together into a rigid grill, with rods forming a frame supporting the radiant sheet and the grid in a spaced apart relationship. The components can be disassembled into a compact bundle, preferably a flat bundle. When assembled, in a preferred embodiment, the radiant heating sheet is adapted to rest on the top of the burner, so that the rods forming the frame need not touch the ground, allowing a single, economical design to be used with most, and perhaps all, commercially available burners. In operation, the burner heats the radiant heating sheet and radiant heat from the sheet cooks food on the grid. Drippings from the cooking food fall through the open grid and strike the radiant heating sheet, creating smoke, which in turn imparts the distinctive "grilled" flavor to the cooked food.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
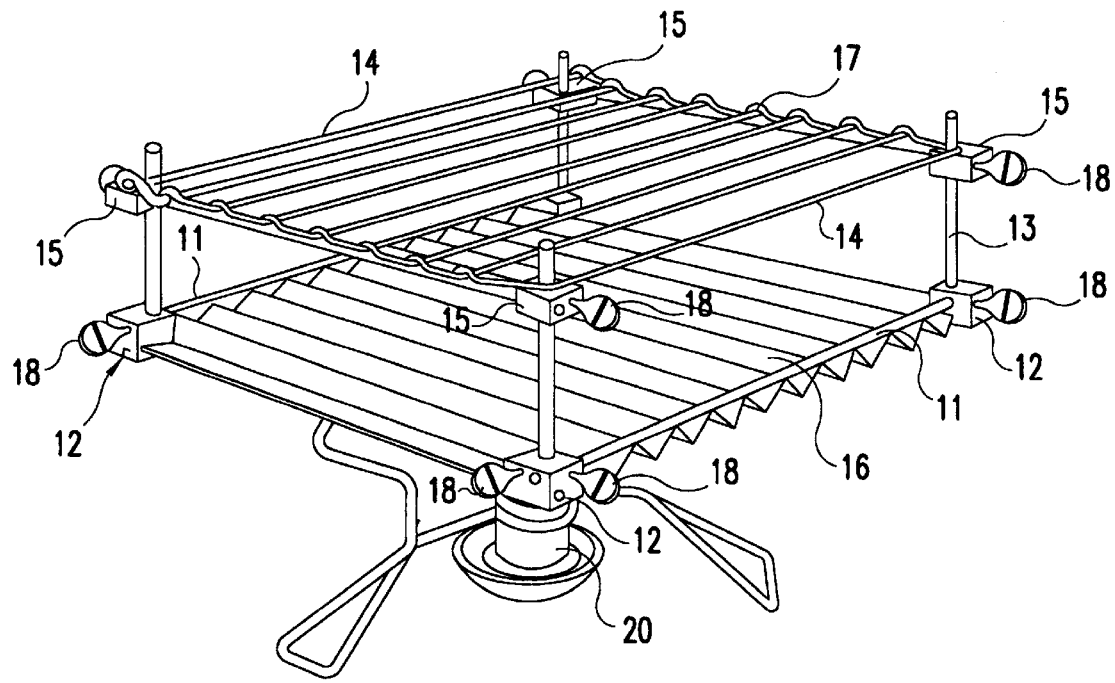
FIG. 1 is a perspective view of an assembled grill in accordance with one embodiment of the invention resting on an open fire, portable burner.
Figure 2:
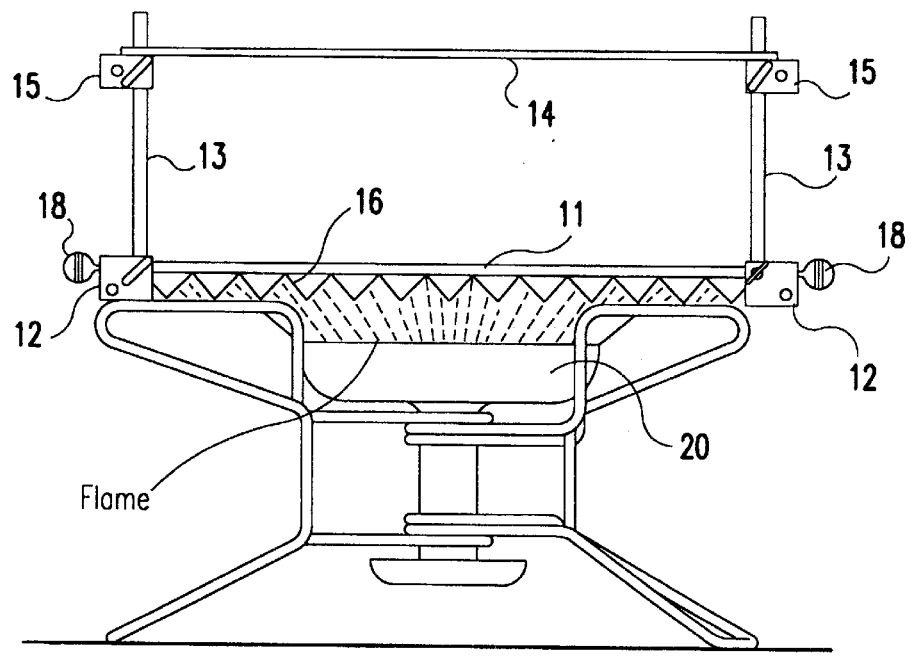
FIG. 2 is a side view of the grill shown in FIG. 1.

Referring now to FIGS. 1 and 2, the assembly comprises a framework of four lower metallic rods 11 joined at the corners by lower metallic blocks 12 to form a square or rectangular frame. Two of the rods 11 are hidden in FIG. 1 by the corrugated sheet. The rods 11 are held in holes in the four lower blocks 12 by thumb screws 18. Thus the bottom frame consists of four horizontal rods, 11, held orthogonal by the lower blocks, 12, creating a rigid structure. A short vertical rod, 13, emanates from each lower corner block 12. One upper rod, 14, is held between one pair of the vertical rods 13 by two upper corner blocks, 15. An identical upper rod 14 is held between the other pair of vertical rods 13 by another pair of upper corner blocks 15. The other two rods, which would make a full upper frame can be omitted to minimize the weight, as they are not required for rigidity.

A radiant heating sheet comprised of a thin piece of corrugated sheet metal 16 (e.g. stainless steel) is removably fastened to the lower frame by placing it under the rods 11 along the side orthogonal to the corrugations and hooking a corrugation segment over the other end rods 11. The corrugations give the sheet metal great strength for its weight across the width yet flexibility along the length when disassembled from the frame. The flexibility allows the corrugated piece to be rolled up for storage, if desired.

A segmented open grate, 17, rests on the pair of upper rods 14 and is detachably hooked over the vertical rods or posts 13 as shown in FIG. 1. This gives assurance it will stay in place. The grate segments are hinged, which makes the grate flexible. This flexibility allows it to also be rolled up for storage. Finger-operable screws 18 in all four upper blocks 15 allow the space between the grill and the corrugation to be adjusted. The finger-operable screws 18 in the lower blocks allow the framework to be disassembled for easy storage when not in use.

Figure 3:
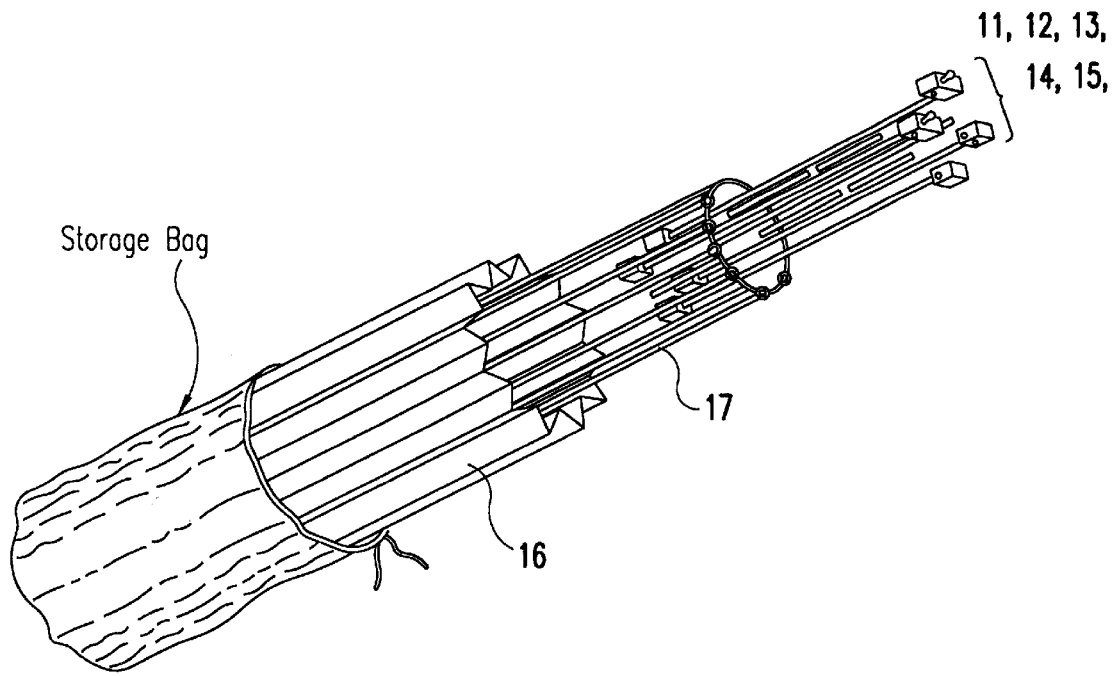
FIG. 3 is a perspective view of the grill shown in FIGS. 1 and 2 in a disassembled state and with the component parts formed into a generally cylindrical bundle in a partially packed state.
Figure 4:
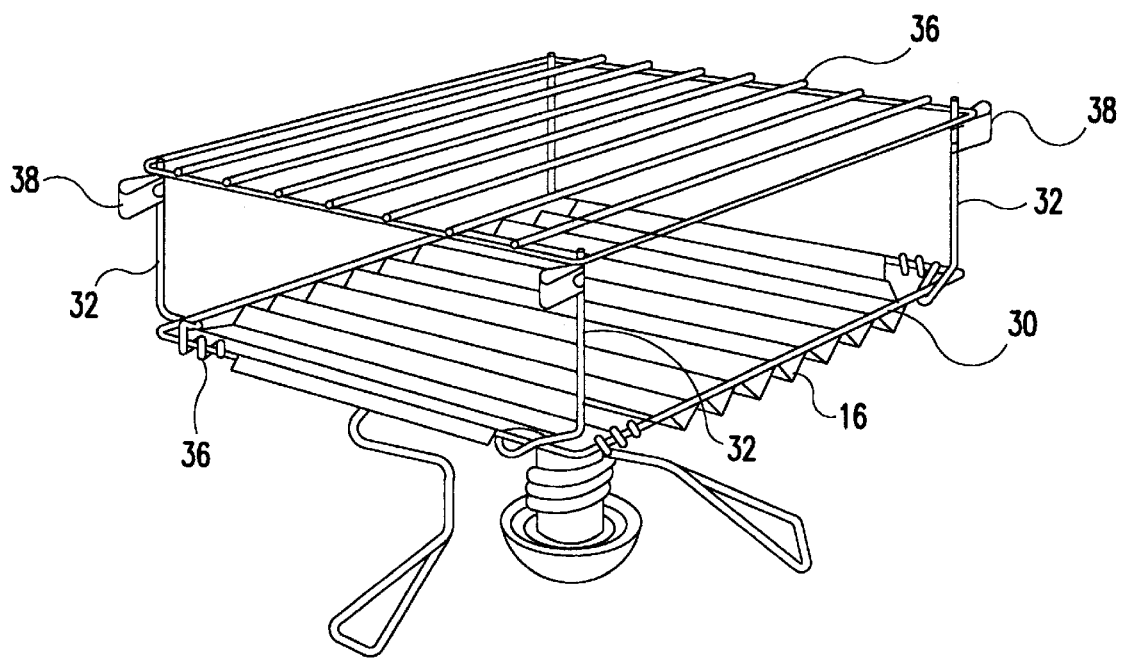
FIG. 4 is a perspective view of an assembled grill in accordance with a preferred embodiment of the invention resting on an open fire, portable burner.
Figure 5:
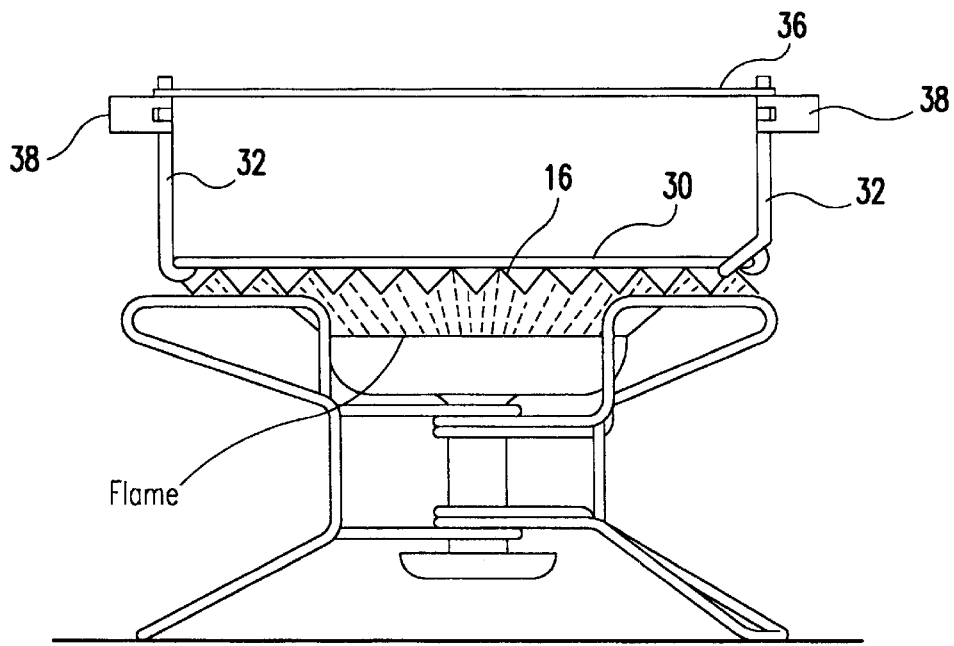
FIG. 5 is a side view of the grill shown in FIG. 4.
Figure 6:
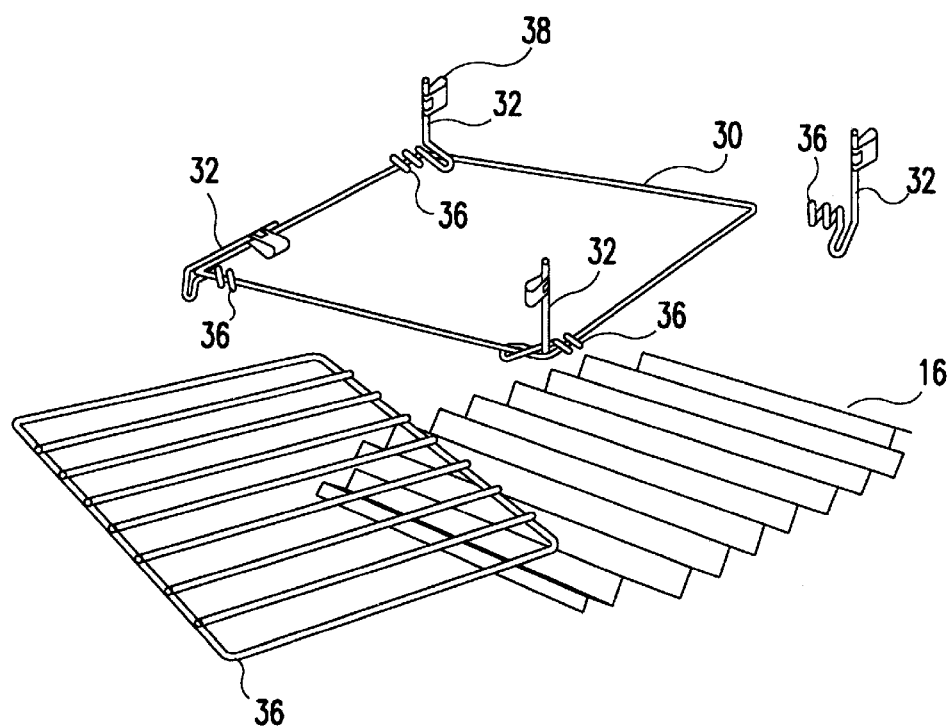
FIG. 6 is a perspective view of the grill shown in FIG. 4 in a disassembled state and with the component parts formable into a generally flat bundle.

The simplified preferred configuration shown in FIGS. 4, 5 and 6 still embodies the same principles as the grill shown in FIGS. 1, 2 and 3. That is, a grate is supported by four comer posts above a radiant heating sheet for cooking. The distance above the radiant heating sheet to the grate is adjustable and the unit can be disassembled for storage. The main changes are the combining of parts into single assemblies and the elimination of hardware. This enhances the unit by eliminating many loose parts, which might be lost, and decreases its weight.

As shown in FIG. 4 and FIG. 6, the four rods 11 in the embodiment of FIGS. 1–3, have been combined into a continuous ring 30 in this embodiment. Each lower block 12 and vertical rod 13 of FIGS. 1–3, have been combined into a single rod 32, with integral helix connector portion 34, which removably connects to the ring 30 in this embodiment. This rod 32 is the same for all four corners. Its design is such that the helix portion of the rod post snaps over the ring 30 and locks the rod in an upright position. If desired, it can be unlocked and folded down. A grate 36 is a rigid unit, instead of being composed of hinged segments as shown in FIGS. 1–3. The grate 36 is supported by hand operable clamps 38. Each clamp has opposing teeth which open when the clamp is squeezed. This allows the clamp to be moved up and down to adjust the height of the grill. FIG. 5 shows the new configuration in a side view. The radiant heating sheet 16 is the same in both embodiments, as shown here. However, it will be appreciated that the radiant heating sheet need not be corrugated, but may be a flat sheet, for example, if desired.

FIG. 6 shows the unit disassembled. Each rod 32 can easily be removed by twisting it off, it can be left on and folded down into a flat configuration. The clamps can also be rotated so as to lie flat. The three assemblies can then be placed on top of each other for compact flat storage.

In order to grill or barbecue, the unit as shown in the figures is placed directly on a portable open flame burner, preferably so that the corrugated sheet metal rests directly on the burner. Because it rests on the burner, its operation is not affected by the height of the burner or the distance from the ground. Of course, if desired, the vertical rods in the embodiments of FIGS. 1–3 or FIGS. 4–6 could be made to extend to the ground and support the grate with the radiant heating sheet a small distance above the burner 20. The flame from the stove against the sheet metal causes it to glow red. The radiant heat from the radiant heating sheet cooks the food on the grill in the same way as glowing charcoal does. As the meat cooks, drippings land on the hot sheet. These drippings make smoke and the rising smoke imparts the grilled or barbecued flavor.

When not in use, the grill can easily be disassembled. Because the parts can be bundled together, the amount of space required for storage is minimal. FIGS. 3 and 6 are semiexploded views of the unit disassembled for storage.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. A disassembleable unit for grilling comestibles with an open fire burner, comprising in combination:
    a plurality of frame members that can be assembled into a rigid frame and disassembled into a compact bundle;
    a corrugated radiant heating sheet;
    a grate;
    said frame supporting said corrugated radiant sheet;
    said frame supporting said grate above said corrugated radiant heating sheet;
    said corrugated radiant heating sheet adapted to support said unit when assembled and resting on an upper surface of said open fire burner;
    whereby an open fire from said burner heats said radiant heating sheet so that radiant heat from said sheet heats a comestible resting on said grate.

2. A disassembleable unit for grilling comestibles with an open fire burner, comprising in combination:
    a plurality of frame members that can be assembled into a rigid frame and disassembled into a compact bundle;
    a corrugated radiant heating sheet;
    a grate;
    said frame supporting said corrugated radiant sheet;
    said frame supporting said grate above said corrugated radiant heating sheet;
    said corrugated radiant heating sheet adapted to support said unit when assembled and resting on an upper surface of said open fire burner;
    whereby an open fire from said burner heats said radiant heating sheet so that radiant heat from said sheet heats a comestible resting on said grate;
    said plurality of frame members, said radiant heating sheet, and said grate are formable into a generally flat bundle when disassembled.

3. A disassembleable unit for grilling comestibles with an open fire burner, comprising in combination:
    a plurality of frame members that can be assembled into a rigid frame and disassembled into a compact bundle;
    a corrugated radiant heating sheet that can be formed into a compact bundle;
    a segmented grate that can be formed into a compact bundle;
    said frame supporting said corrugated radiant heating sheet in an extended corrugated surface configuration;
    said frame supporting said segmented grate in an extended segmented grate surface configuration above said corrugated radiant heating sheet in its extended corrugated surface configuration;
    whereby an open fire from said burner heats said extended corrugated surface so that radiant heat from said extended corrugated surface heats and cooks a comestible resting on said extended segmented grill surface.

4. A disassembleable unit for grilling comestibles with an open fire burner, comprising in combination:
    a plurality of frame members that can be assembled into a rigid frame and disassembled into a compact bundle;
    a radiant heating sheet;
    a grate;
    said frame supporting said radiant sheet;
    said frame supporting said grate above said radiant heating sheet;
    said radiant heating sheet adapted to support said unit when assembled and resting on an upper surface of said open fire burner;
    whereby an open fire from said burner heats said radiant heating sheet so that radiant heat from said sheet heats a comestible resting on said grate.

5. A disassembleable unit for grilling comestibles with an open fire burner, comprising in combination:
    a plurality of frame members that can be assembled into a rigid frame and disassembled into a compact bundle;
    a radiant heating sheet;
    a grate;
    said frame supporting said radiant sheet;
    said frame supporting said grate above said radiant heating sheet;
    said radiant heating sheet adapted to support said unit when assembled and resting on an upper surface of said open fire burner;
    whereby an open fire from said burner heats said radiant heating sheet so that radiant heat from said sheet heats a comestible resting on said grate;
    said plurality of frame members, said radiant heating sheet, and said grate are formable into a generally flat bundle when disassembled.

6. A disassembleable unit for grilling comestibles with an open fire burner, comprising in combination:
- a plurality of frame members that can be assembled into a rigid frame and disassembled into a compact bundle;
- a radiant heating sheet that can be formed into a compact bundle;
- a segmented grate that can be formed into a compact bundle;
- said frame supporting said radiant heating sheet in an extended surface configuration;
- said frame supporting said segmented grate in an extended segmented grate surface configuration above said radiant heating sheet in its extended surface configuration;
- whereby an open fire from said burner heats said extended surface so that radiant heat from said extended surface heats and cooks a comestible resting on said extended segmented grill surface.

* * * * *